3,474,106
3-LOWER-ALKYL - 1,2,3,4,5,6 - HEXAHYDRO-6,11-
DI-LOWER-ALKYL - 9-DIETHYLAMINOMETHYL-
2,6-METHANO-3-BENZAZOCIN-8-OLS
Albert Ziering, Nutley, N.J., assignor to Hoffmann-La
Roche Inc., Nutley, N.J., a corporation of New Jersey
No Drawing. Filed Nov. 16, 1966, Ser. No. 594,652
Int. Cl. C07d 29/10, 29/16
U.S. Cl. 260—294.7     3 Claims

ABSTRACT OF THE DISCLOSURE

This invention relates to compounds of the formula

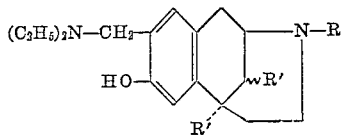

wherein R is loweralkyl of 1 to 7 carbon atoms and R' is lower alkyl of 1 to 4 carbon atoms. These compounds are useful as intermediates in the preparation of analgesics.

---

This invention relates to benzomorphan compounds. More particularly, this invention relates to 3-substituted-1,2,3,4,5,6 - hexahydro-6,11-dialkyl-9-methyl-2,6-methano-3-benzazocin-8-ols, and intermediates and processes for their preparation.

The compounds of this invention which exist in two steroisomeric forms are depicted by the following formula

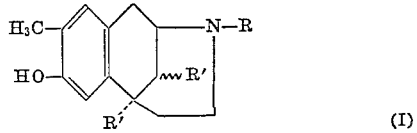

wherein R is alkyl, cycloalkylmethyl, allyl and 3,3-dialkylallyl and R' is alkyl.

The two steroisomeric forms of the compounds of this invention are the cis or α configuration and the trans or β configuration. The compounds differ in the configuration at the 11 carbon atom and are represented by the following formulae in which Ia is the α configuration and Ib is the β configuration

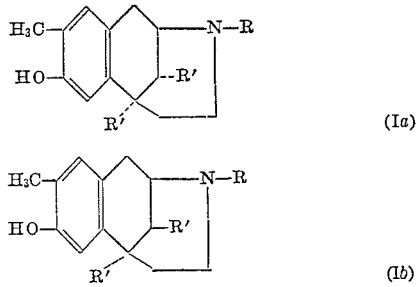

The invention also relates to acid addition salts of the compounds of Formula I with pharmaceutically acceptable organic and inorganic acids, e.g., hydrochloric, phosphoric, maleic, nitric, acetic, salicylic, etc.

In Formulae I, Ia and Ib whenever R is used, the term alkyl is understood to include lower alkyl groups having from 1 to 7 carbon atoms which can be either straight or branched chain alkyl groups, e.g., methyl, ethyl, propyl, 2,2-dimethylpropyl, butyl, isobutyl, tertiary butyl, hexyl, heptyl, etc. and the term cycloalkyl is understood to include cyclo-lower alkyl groups having from 3 to 5 carbon atoms, e.g., cyclopropyl, cyclobutyl and cyclopentyl and whenever R' is used, alkyl is understood to include lower alkyl groups having from 1 to 4 carbon atoms which can be either straight or branched chain alkyl groups, e.g., methyl, ethyl, propyl, isopropyl, butyl, isobutyl and tertiary butyl.

The compounds of Formula I, as well as the acid addition salts thereof, possess valuable pharmaceutical properties, for example, analgesic properties. In addition, some of these compounds possess morphine antagonist properties. Not only do these compounds possess pharmaceutical properties, but they also can be used as intermediates to prepare other compounds with valuable pharmaceutical properties.

The compounds of Formula I can be employed as medicaments, for example, in the form of pharmaceutical preparations. These products, that is, both the bases and acid addition salts thereof, can be used as such or in admixture with other compounds and they can be embodied in a form suitable for enteral or parenteral administration. For example, the present products can be mixed with inert adjuvants either inorganic or organic in nature, such as, water, gelatin, lactose, starch, magnesium stearate, talc, vegetable oils, gums, polyalkylene glycols, Vaseline, etc. These pharmaceutical preparations can be provided in the form of tablets, dragees, suppositories, or they can be incorporated in suitable capsules. Additionally, they may be provided in liquid form, for example, as solutions, suspensions or emulsions. If desired, the products can be sterilized and/or mixed with adjuvant materials, such as preservatives, stabilizers, wetting or emulsifying agents, salts for altering osmotic pressure or buffers. If desired, they can be used also in admixture with other therapeutically valuable substances.

The compounds of Formula I can be prepared by alternative methods, depending upon the starting materials, i.e., those with alkyl substituents on the nitrogen can be prepared, e.g., by using as the starting material 1,2,3,4,5, 6 - hexahydro-3,6,11-trimethyl-2,6-methano-3-benzazocin-8-ol, [May et al., J. Org. Chem. 24 1432 (1959)] or 1,2,3,4,5,6 - hexahydro - 3 - methyl - 6,11 - dialkyl - 2,6-methano - 3 - benzazocin-8-ol, [Fullerton et al., J. Org. Chem. 27 2144 (1962)] and methylating the 9-position. This accomplished by reacting with diethylamine and paraformaldehyde forming the novel intermediate compound

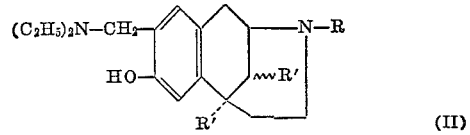

followed by hydrogenation in the presence of a palladium-charcoal catalyst.

Alternatively, 1,2,3,4,5,6 - hexahydro - 6,11 - dimethyl-2,6-methano-3-benzazocin-8-ol [May et al., J. Org. Chem. 24 1435 (1959)] can be used as the starting material and first alkylated in the 3-position with the appropriate chloride, e.g., propionyl chloride followed by reduction of the resulting amide. This 3-alkyl substituted compound is then methylated in the 9-position as previously described.

The allyl and 3,3-dialkylallyl substituted compounds of Formula I are produced by dealkylating the 3-position, producing the novel intermediate of the formula

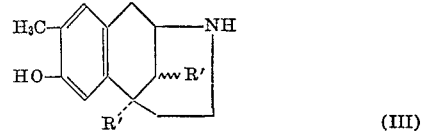

This is accomplished by first reacting 3-alkyl substituted compounds of Formula I with acetic anhydride to form an acetoxy protective group on the 8 position. The resulting novel acetoxy intermediate of the formula

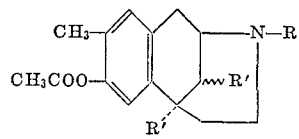

(IV)

is then reacted with bromocyanogen to form the novel nitrile of the formula

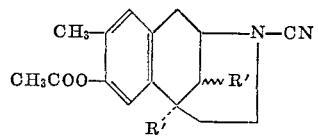

(V)

which is then refluxed with dilute hydrochloric acid to produce the compound of Formula III.

Compound III can be reacted with either 3,3-dialkyl allyl bromide in dimethylformamide or allyl bromide in alcohol to substitute the nitrogen and form the corresponding nitrogen substituted compound of Formula I.

The cycloalkyl methyl derivatives of Formula I are formed by reacting compound III with the appropriate cycloalkanecarbonyl chloride, forming the novel intermediate of the formula

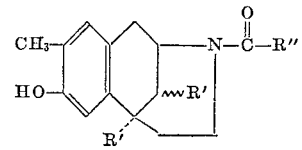

(VI)

wherein R" is cycloalkyl containing from 3 to 5 carbon atoms inclusive.

This amide is finally reduced to form the cycloalkyl methyl derivatives of compound I.

As can be seen from the following reaction scheme, the compounds of Formula I are either a product useful as a pharmaceutical compound or an intermediate useful for producing other pharmaceutical compounds or both.

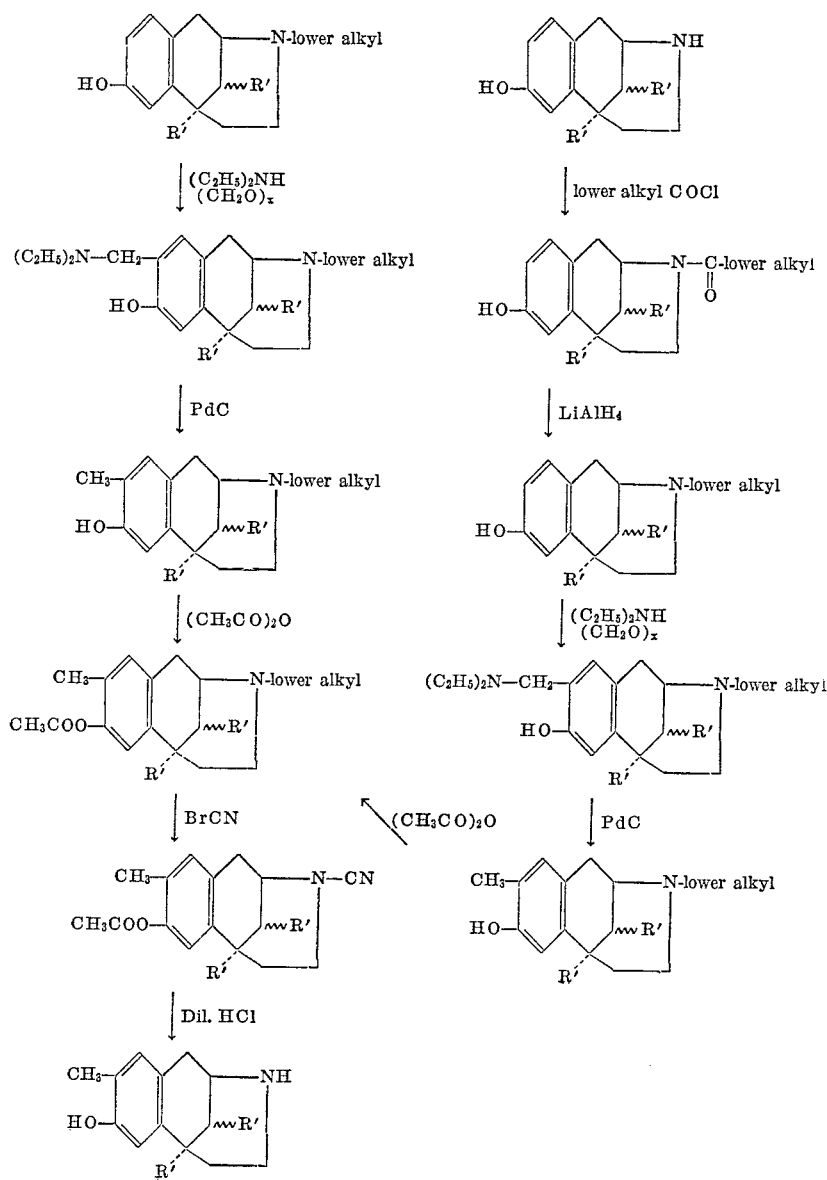

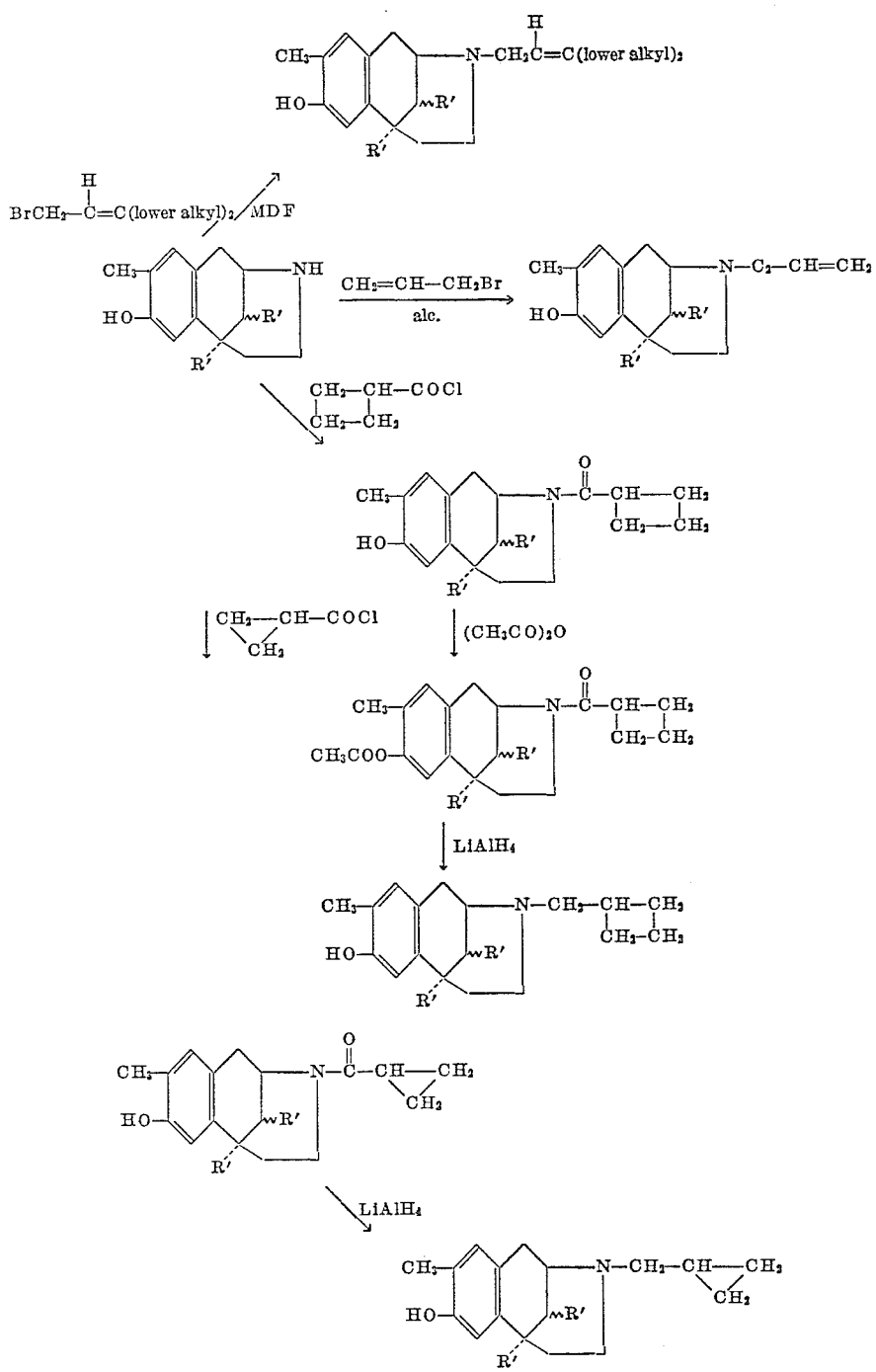

The compounds of Formula I, i.e., either the α or β configuration can be resolved by known methods into their optical antipodes, e.g., resolution of the racemate can be effected by formation of the (+)-3-bromocamphor-8-sulfonic acid ammonium salt.

The racemates as well as the antipodes of the compounds of Formulas I, Ia and Ib are included in the scope of this invention.

The following examples illustrate the methods of preparation of the compounds of this invention. In the examples, all temperatures are in degrees centigrade.

EXAMPLE 1

α-1,2,3,4,5,6-hexahydro-3,6,9,11-tetramethyl-2,6-methano-3-benzazocin-8-ol HCl 23.2 g. of α-1,2,3,4,5,6-hexahydro-3,6,11-trimethyl-2,6-methano-3-benzazocin-8-ol was added to 100 ml. of toluene containing 10.8 of diethylamine and 10 g. of para-formaldehyde. The mixture was refluxed for 20 hrs. Then the solvent was extracted with 50 ml. of water twice and dried over potassium carbonate. The solvent was distilled off. The precipitate was a Mannich base substituted in the 9-position. This Mannich base (30.9 g.) was dissolved in 200 ml. of alcohol containing 2 g. of 10% PdC and the mixture hydrogenated at 135° and 450 p.s.i. hydrogen pressure for 10 hrs. The reaction product was recovered and reacted with HCl gas forming the hydrochloride salt. The hydrochloride melted at 183–185°

(CH$_3$CN—CH$_3$OH)

and the free base melted at 175°.

EXAMPLE 2

α-1,2,3,4,5,6-hexahydro-6,9,11-trimethyl-2,6-methano-3-benzazocin-8-ol 21.7 g. of α-1,2,3,4,5,6-hexahydro-3,6,9,11-tetramethyl-2,6-methano-3-benzazocin-8-ol was added to 50 ml. of acetic anhydride and the solution heated on the steam bath for 3 hrs. 25 g. of the crude acetoxy derivative was recovered. The acetoxy derivative was dissolved in 100 ml. of chloroform and added dropwise, over 2 hrs., to a solution of 10.4 g. of bromocyanogen in 100 ml. of chloroform. The solution was then refluxed for 3 hrs. The solution was cooled and extracted with dilute hydrochloric acid. The chloroform was distilled off and the nitrile was recovered. 480 ml. of 9% hydrochloric acid was added to the nitrile, and the mixture refluxed for 8 hrs. Then the solution was cooled and neutralized with concentrated ammonia. The free base was extracted with butanol. The solvent was distilled off and the residue boiled with cyclohexane until the oil hardened. The compound was recrystallized from methyl ethyl ketone-methanol and recovered. It had a M.P. of 210–212°.

EXAMPLE 3

α-1,2,3,4,5,6-hexahydro-3-(3-methyl-2-butenyl)-6,9,11-trimethyl-2,6-methano-3-benzazocin-8-ol HCl 2.3 g. of α-1,2,3,4,5,6-hexahydro-6,9,11-trimethyl-2,6-methano-3-benzazocin-8-ol was added to 30 ml. of dimethylformamide containing 1.5 g. of 3,3-dimethylallyl bromide and 1.2 g. of sodium bicarbonate. The mixture was refluxed for 5 hrs. Then the solvent was distilled off, water added and the oil extracted with chloroform. The chloroform was distilled off and the residue dissolved in ethyl acetate. The hydrochloride was prepared by reacting with HCl gas and recrystallized from acetone-methanol. The hydrochloride was then recovered. It had a M.P. of 248–250°.

EXAMPLE 4

α-1,2,3,4,5,6-hexahydro-3-propyl-6,9,11-trimethyl-2,6-methano-3-benzazocin-8-ol HCl 3.7 g. of α-1,2,3,4,5,6-hexahydro-6,11-dimethyl-2,6-methano-3-benzazocin-8-ol were suspended in 50 ml. of chloroform containing 1.7 g. of triethylamine. A solution of 1.6 g. of propionyl chloride in 20 ml. of chloroform was added dropwise, with stirring. The solution was stirred for 3 hrs. after the addition. Then the chloroform solution was extracted with water. The solution was worked up in the usual manner to yield 3.5 g. of crude amide. Reduction of the amide with LiAlH$_4$ in tetrahydrofuran yielded 1.5 g. of the crude N-propyl compound soluble in ether and cyclohexane. 1.5 g. of the crude N-propyl compound was then added to 100 ml. of toluene containing .65 g. of diethylamine and .6 g. of paraformaldehyde and the mixture refluxed for 20 hrs. Then the solvent was extracted with 50 ml. of water twice and the crude Mannich base was recovered. 1.8 g. of the Mannich base in 200 ml. alcohol solution was reduced in the presence of 1 g. of 10% PdC at 135° and 450 p.s.i. of hydrogen for 12 hrs. to yield the desired base. Upon reaction with HCl gas the hydrochloride melting at 260–262° (acetone-methanol), was formed and recovered.

EXAMPLE 5

α-1,2,3,4,5,6-hexahydro-3-allyl-6,9,11-trimethyl-2,6-methano-3-benzazocin-8-ol HCl 2.3 of α-1,2,3,4,5,6-hexahydro-6,9,11-trimethyl-2,6-methano-3-benzazocin-8-ol were added to 100 ml. of alcohol containing 1.2 g. of allyl bromide and .7 g. of potassium carbonate. The mixture was refluxed for 24 hrs. and the base, M.P. 148–149° (heptane), was recovered. Upon reaction with HCl gas the hydrochloride melting at 235–236° was formed and recovered.

EXAMPLE 6

α-1,2,3,4,5,6-hexahydro-3-cyclopropylmethyl-6,9,11-trimethyl-2,6-methano-3-benzazocin-8-ol HCl 2.7 g. of α-1,2,3,4,5,6-hexahydro-6,9,11-trimethyl-2,6-methano-3-benzazocin-8-ol were suspended in 100 ml. of chloroform containing 1.2 g. of triethylamine. A solution of 1.2 g. of cyclopropanecarbonyl chloride in 20 ml. of chloroform was added dropwise with stirring. The solution was refluxed for 3 hrs. and 3.1 g. of the crude amide was recovered. This amide was reduced with LiAlH$_4$ in tetrahydrofuran to yield .4 g. of the hydrochloride salt, M.P. 273–275° (acetonitrile-methanol).

EXAMPLE 7

α-1,2,3,4,5,6-hexahydro-3-cyclobutylmethyl-6,9,11-trimethyl-2,6-methano-3-benzazocin-8-ol HCl 1.8 g. of α-1,2,3,4,5,6-hexahydro-6,9,11-trimethyl-2,6-methano-3-benzazocin-8-ol were suspended in 50 ml. of chloroform containing .8 g. of triethylamine. A solution of .9 g. of cyclobutanecarbonyl chloride in 25 ml. of chloroform was added dropwise with stirring. The solution was stirred for 2 hrs. Then the chloroform solution was extracted with dilute hydrochloric acid to remove any unreacted starting material. The chloroform solution was dried (Na$_2$SO$_4$) and the solvent distilled off in vacuo. The residue was treated with 15 ml. of acetic anhydride and the solution heated on a steam bath for 2 hrs. The acetic anhydride was then distilled off in vacuo and the residue treated with dilute sodium carbonate solution. The oil was extracted with ethyl acetate, dried (K$_2$CO$_3$) and the solvent distilled off in vacuo. The residue weighed 1.8 g. Reduction of this residue in the usual way with LiAlH$_4$ (1 g.) yielded the base which was isolated as the hydrochloride. It was recrystallized from $$CH_3CN—CH_3OH$$

and recovered. The compound had a M.P. of 300°.

The following are typical pharmaceutical forms in which the compounds of Formula I can be utilized.

EXAMPLE 8

α-1,2,3,4,5,6-hexahydro-3-cyclopropylmethyl-6,9,11-trimethyl-2,6-methano-3-benzazocin-8-ol hydrochloride

TABLET FORMULATION

| | Per tablet (mg.) |
|---|---|
| α - 1,2,3,,4,5,6 - hexahydro-3-cyclopropylmethyl-6,9,11 - trimethyl - 2,6 - methano - 3 - benzazocin-8-ol hydrochloride | 10.0 |
| Lactose | 129.0 |
| Corn starch | 50.0 |
| Pregelatinized corn starch | 8.0 |
| Calcium stearate | 3.0 |
| Total weight | 200.0 |

Procedure (1) α - 1,2,3,4,5,6 - hexahydro - 3 - cyclopropylmethyl-6,9,11 - trimethyl - 2,6 - methano - 3 - benzazocin - 8 - ol hydrochloride, lactose, corn starch, and pregelatinized corn starch were mixed in a suitable mixer.

(2) The mix was passed through a Fitzpatrick Comminuting Machine fitted with No. 1A screen and with knives forward.

(3) The mixture was returned to the mixer and moistened with water to a thick paste. The moist mass was passed through a No. 12 screen, and the moist granules were dried on paper lined trays at 110° C.

(4) The dried granules were returned to the mixer, and the calcium stearate was added and mixed well.

(5) The granules were compressed at a table weight of 200 mg. using standard concave punches having a diameter of ⁵⁄₁₆″.

α - 1,2,3,4,5,6 - hexahydro - 3,6,9,11 - tetramethyl - 2,6 - methano - 3 - benzazocin - 8 - ol hydrochloride or α - 1,2,3,4,5,6 - hexahydro - 3 - propyl - 6,9,11 - trimethyl-2,6 - methano - 3 - benzazocin - 8 - ol hydrochloride may be substituted for α-1,2,3,4,5,6-hexahydro-3-cyclopropylmethyl - 6,9,11 - trimethyl - 2,6 - methano - 3 - benzazocin-8-ol hydrochloride in this formulation.

EXAMPLE 9

α-1,2,3,4,5,6-hexahydro-3-allyl-6,9,11-trimethyl-2,6-methano-3-benzazocin-8-ol hydrochloride

TABLET FORMULATION

| | Per tablet (mg.) |
|---|---|
| α - 1,2,3,4,5,6 - hexahydro - 3 - allyl - 6,9,11-trimethyl - 2,6 - methano - 3 - benzazocin-8-ol hydrochloride | 10.00 |
| Dicalcium phosphate dihydrate, unmilled | 190.00 |
| Corn starch | 24.00 |
| Magnesium stearate | 1.00 |
| Total weight | 225.00 |

Procedure (1) α - 1,2,3,4,5,6 - hexahydro - 3 - allyl - 6,9,11 - trimethyl-2,6-methano-3-benzazocin-8-ol hydrochloride and corn starch were mixed together and passed through a No. 00 screen in Model "J" Fitz with hammers forward.

(2) This premix was then mixed with dicalcium phosphate and one-half of the magnesium stearate, passed through a No. 1A screen in Model "J" Fitz with knives forward and slugged.

(3) The slugs were passed through a No. 2A plate in a Model "D" Fitz at slow speed with knives forward, and the remaining magnesium stearate was added.

(4) The mixture was mixed and compressed.

α - 1,2,3,4,5,6 - hexahydro - 3 - (3 - methyl - 2 - butenyl) - 6,9,11 - trimethyl - 2,6 - methano - 3 - benzazocin-8-ol hydrochloride may be substituted for α-1,2,3,4,5,6 - hexahydro - 3 - allyl - 6,9,11 - trimethyl - 2,6 - methano-3-benzazocin-8-ol hydrochloride in this formulation.

EXAMPLE 10

α-1,2,3,4,5,6-hexahydro-3-allyl-6,9,11-trimethyl-2,6-methano-3-benzazocin-8-ol hydrochloride

CAPSULE FORMULATION

| | Per capsule (mg.) |
|---|---|
| α - 1,2,3,4,5,6 - hexahydro - 3 - allyl - 6,9,11 - trimethyl - 2,6 - methano - 3 - benzazocin-8-ol hydrochloride | 10 |
| Lactose, U.S.P. | 165 |
| Corn starch, U.S.P. | 30 |
| Talc, U.S.P. | 5 |
| Total weight | 210 |

Procedure (1) α - 1,2,3,4,5,6 - hexahydro - 3 - allyl - 6,9,11 - trimethyl-2,6-methano-3-benzazocin-8-ol hydrochloride, lactose, and corn starch were mixed in a suitable mixer.

(2) The mixture was further blended by passing through a Fitzpatrick Comminuting Machine with a No. 1A screen with knives forward.

(3) The blended powder was returned to the mixer, the talc added and blended thoroughly.

(4) The mixture was filled into No. 4 hard shell gelatin capsules on a Parke Davis capsulating machine. (Any similar type capsulating machine may be used.)

The compounds of Examples 1, 3, 4, 6 and 7 may be substituted for α-1,2,3,4,5,6-hexahydro-3-allyl-6,9,11-trimethyl-2,6-methano-3-benzazocin-8-ol hydrochloride in this formulation.

EXAMPLE 11

α - 1,2,3,4,5,6 - hexahydro - 3 - cyclopropylmethyl-6,9,11-trimethyl-2,6-methano-3-benzazocin-8-ol hydrochloride

PARENTERAL FORMULATION

| | Per ml. (mg.) |
|---|---|
| α - 1,2,3,4,5,6 - hexahydro - 3 - cyclopropylmethyl-6,9,11 - trimethyl - 2,6 - methano - 3 - benzazocin-8-ol hydrochloride | 2.0 |
| Disodium edetate, U.S.P. | 0.1 |
| Sodium acetate·3H$_2$O | 0.2 |
| Acetic acid glacial | 0.3 |
| Sodium formaldehyde sulfoxylate | 1.0 |
| Water for injection q.s. ad 1.0 ml. | |

Procedure (1) α - 1,2,3,4,5,6 - hexahydro - 3-cyclopropylmethyl-6,9,11 - trimethyl - 2,6 - methano-3-benzazocin-8-ol hydrochloride was dissolved in part of the water for injection.

(2) The disodium edetate, acetic acid, sodium acetate, and sodium formaldehyde sulfoxylate were added in that order with stirring until completely in solution.

(3) The solution was brought to final volume with water for injection and allowed to stand in tightly stoppered glass containers for approximately 24 hours; the solution was then filtered under aseptic conditions through an 02 Selas candle.

(4) The filtered solution was filled, under aseptic conditions, into sterilized ampuls of the desired size and sealed under an atmosphere of nitrogen.

(5) All ampuls were inspected, and those containing any amounts of excessive fibers were rejected.

I claim:

1. A compound represented by the formula

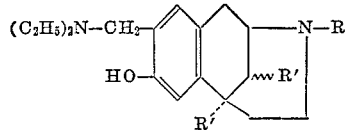

wherein R is lower alkyl having from 1 to 7 carbon atoms and R' is lower alkyl having from 1 to 4 carbon atoms.

2. A compound of the formula

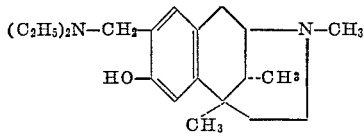

3. A compound of the formula

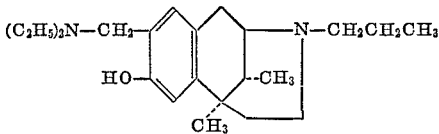

References Cited

UNITED STATES PATENTS

| 3,138,603 | 6/1964 | May | 260—294.7 |
| 3,250,678 | 5/1966 | Archer | 260—294.7 |
| 3,341,538 | 9/1967 | Block et al. | 260—294.7 |
| 3,351,626 | 11/1967 | Bartels-Keith et al. | 260—294.7 |
| 3,372,165 | 3/1968 | Archer | 260—294.7 |

HENRY R. JILES, Primary Examiner

G. T. TODD, Assistant Examiner

U.S. Cl. X.R.

260—294.3; 424—267